United States Patent
L'Eplattenier et al.

[11] 3,878,188
[45] Apr. 15, 1975

[54] PROCESS FOR THE MANUFACTURE OF COLOURED POLYCYCLIC METAL COMPLEXES

[75] Inventors: Francois L'Eplattenier, Therwil; Andre Pugin, Riehen, both of Switzerland

[73] Assignee: Ciba-Geigy Corporation, Ardsley, N.Y.

[22] Filed: Dec. 12, 1972

[21] Appl. No.: 314,492

[30] Foreign Application Priority Data
Dec. 15, 1971 Switzerland................ 18356/71

[52] U.S. Cl........ 260/146 R; 106/208 Q; 260/37 P; 260/145 C; 260/239 BC; 260/270 R
[51] Int. Cl.. C09b 45/28; C09b 45/30; C09b 45/32
[58] Field of Search.............. 260/145 C, 146 R

[56] References Cited
FOREIGN PATENTS OR APPLICATIONS
369,837 7/1963 Switzerland............... 260/146 R OTHER PUBLICATIONS
Dimroth et al., "5.14–Dihydro–Dibenzo[b,1][5.9.14.-18]tetraaza[14]Annulen, Ein Makrocyclischer Chelat– Annalen, 717, 1968.

Primary Examiner—Floyd D. Higel
Assistant Examiner—C. F. Warren
Attorney, Agent, or Firm—Vincent J. Cavalieri

[57] ABSTRACT
Process for the manufacture of polycyclic metal complexes of the formulae

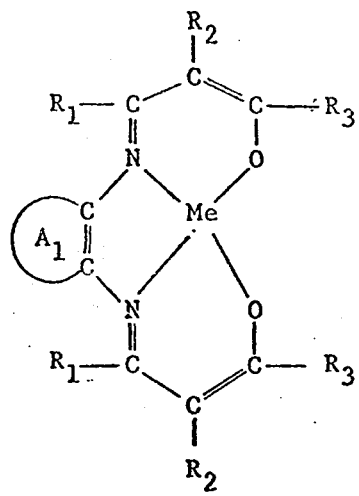

or

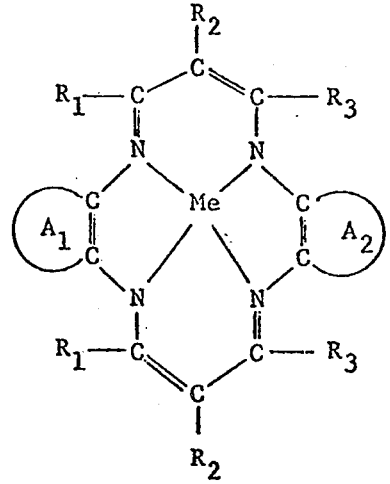

wherein $A_1$ and $A_2$ are carbocyclic or heterocyclic aromatic radicals, $R_1$ and $R_3$ are hydrogen atoms, aliphatic hydrocarbon radicals or aryl radicals, and $R_2$ is a hydrogen or halogen atom or an alkyl, aryl, nitro, nitrile or arylazo group, chargerised in that a carbocyclic or heterocyclic aromatic 1,2-diamine is reacted with a 1,3-dicarbonyl compound in the presence of a divalent metal ion, in an organic solvent.

The products obtained according to this process a valuable pigments for coloring plastics.

4 Claims, No Drawings

PROCESS FOR THE MANUFACTURE OF COLOURED POLYCYCLIC METAL COMPLEXES

It has been found that valuable, coloured polycyclic metal complexes of the formulae

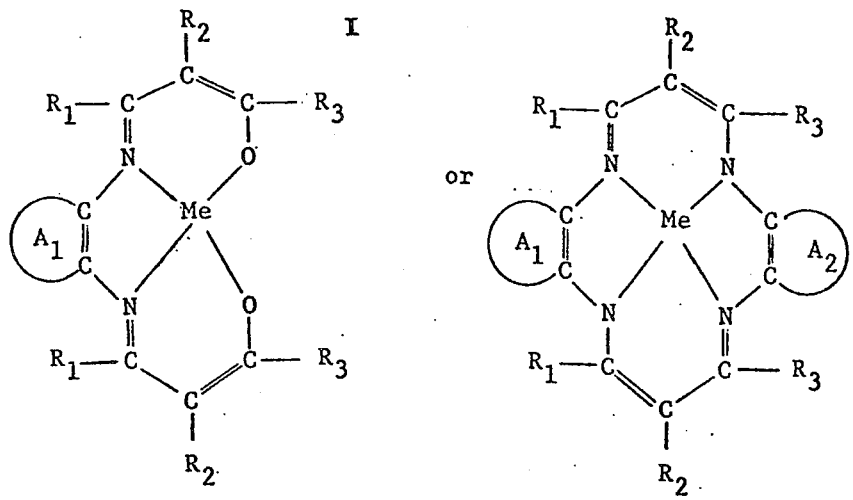

wherein $A_1$ and $A_2$ denote carbocyclic or heterocyclic aromatic radicals, Me denotes a divalent metal atom, $R_1$ and $R_3$ denote hydrogen atoms or alkyl or aryl radicals which are optionally substituted, for example by halogen atoms, $R_2$ denotes a hydrogen or halogen atom or an alkyl, aryl, nitro, nitrile or arylazo group or the radicals $R_2$ and $R_3$ together form a fused carbocyclic ring, are obtained if a carbocyclic or heterocyclic aromatic 1,2-diamine is reacted with a 1,3-dicarbonyl compound in the presence of a divalent metal ion in an organic solvent.

Aromatic 1,2-diamines used are preferably o-phenylenediamines, especially those of the formula

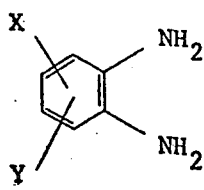

wherein X and Y denote hydrogen or halogen atoms or alkyl, alkoxy, phenoxy, phenyl, alkylsulphonyl, carboxy, alkoxycarbonyl, acylamino, aminocarbonyl or sulphonic acid groups, or two adjacent radicals X and Y together form a fused carbocyclic or heterocyclic 5-membered or 6-membered ring.

As examples there may be mentioned: 1,2-phenylenediamine, 4-chloro-1,2-phenylenediamine, 4,5-dichloro-1,2-phenylenediamine, 4-methyl-1,2-phenylenediamine, 4,5-dimethyl-1,2-phenylenediamine, 3,5-dimethyl-1,2-phenylenediamine, 4-methoxy-1,2-phenylenediamine, 4-phenoxy-1,2-phenylenediamine, 4-methylsulphonyl-1,2-phenylenediamine, 4-ethylsulphonyl-1,2-phenylenediamine, 4-carboxy-1,2-phenylenediamine, 4-methoxycarbonyl-1,2-phenylenediamine, 4-ethoxycarbonyl-1,2-phenylenediamine, 4-butoxycarbonyl-1,2-phenylenediamine, 4-hexyloxycarbonyl-1,2-phenylenediamine, 4-octyloxycarbonyl-1,2-phenylenediamine, 4-nitro-1,2-phenylenediamine, 4-cyano-1,2-phenylenediamine, 4-acetylamino-1,2-phenylenediamine, 4-benzoylamino-1,2-phenylenediamine, 3,4-diaminodiphenyl, 1,2-diaminonaphthalene, 2,3-diaminonaphthalene, 1,2-diamino-5,6,7,8-tetrahydronaphthalene, 2,3-diamino-5,6,7,8-tetrahydronaphthalene, 1,2-diaminoanthraquinone, 2,3-diaminoanthraquinone, 9,10-diaminophenanthrene, 5,6-diaminoacenaphthene, 3,4-diaminopyridine, 2,3-diaminodiphenylene oxide, 2,3-diaminoquinoxaline, and 2-methyl-5,6-diamino-benzimidazol.

Possible 1,3-dicarbonyl compounds are, in particular, 1,3-dialdehydes or 1,3-diketones of the formula

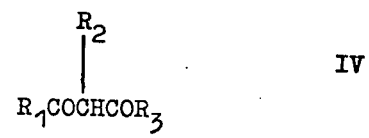

wherein $R_1$ and $R_3$ denote hydrogen atoms or optionally substituted alkyl or aryl groups and $R_2$ denotes a hydrogen or halogen atom or an alkyl, aryl, nitro, cyano or arylazo group, especially an optionally substituted phenylazo group of the formula

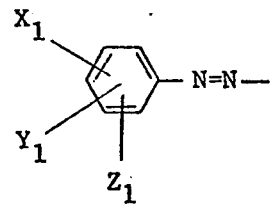

wherein $X_1$ and $Y_1$ denote hydrogen or halogen atoms or alkyl, alkoxy, phenoxy, phenylazo, acyl, aminocarbonyl, trifluoromethyl, alkylsulphonyl, alkoxycarbonyl, acylamino, for example alkanoylamino or benzoylamino, nitro, cyano, carboxylic acid or sulphonic acid groups and $Z_1$ denotes a hydrogen or halogen atom or an alkyl group.

As examples there may be mentioned: malondialdehyde, 2-chloromalondialdehyde, 2-methylmalondialdehyde, 2-cyanomalondialdehyde, phenyl-azo-malondialdehyde, 4'-chloro-phenyl-azomalondialdehyde, 2',4'-dichloro-phenyl-azomalondialdehyde, 2,5-dichloro-phenyl-azo-malondialdehyde, 2',4',5'-trichlorophenyl-azo-malondialdehyde, 4'-nitro-phenyl-azo-malondialdehyde, 4'-cyano-phenyl-azo-malondialdehyde, 4'-methylsulphonyl-phenyl-azo-malondialdehyde, 3'-acetylamino-phenyl-azo-malondialdehyde, 2'-sulpho-phenyl-azo-malondialdehyde, 3'-sulpho-phenyl-azo-malondialdehyde, 3'-carboxy-phenyl-azo-malondialdehyde, 4'-sulpho-phenyl-azo-malondialdehyde, 2',5'-disulpho-phenyl-azo-malondialdehyde, acetylacetoaldehyde, phenyl-azo-acetylacetoaldehyde, acetylacetone, 4'-chlorophenyl-azo-acetylacetone, propionylacetone, 4'-cyanophenyl-azo-propionylacetone, benzoylacetone, 4'-acetylamino-phenyl-azo-benzoylacetone, 1,5-dichloro-pentane-2,4-dione, hydroxymethylenecyclohexanone, hydroxymethylenecyclopentanone, and hydroxymethyleneacetophenone.

The reaction of the dioxo compound with the diamine takes place in the presence of divalent metal ions, for example, ions of zinc, divalent cobalt and especially copper or nickel. The salts of divalent nickel are particularly preferentially used as metal compounds. These metals are appropriately employed in the form of their soluble salts, for example their chlorides or sulphates, or especially in the form of the salts of the lower fatty acids, for example of acetic acid, propionic acid or butyric acid.

The reaction appropriately takes place in a hydrophilic organic solvent, for example in a lower aliphatic alcohol, such as methanol, ethanol, propanol, isopropanol, butanol or isobutanol, ethylene glycolmonomethyl ether or ethyl ether, or in a lower fatty acid, especially acetic acid, at temperatures between 50° – 120°C, especially 60° – 90°C.

Depending on the choice of the solvent or of the dicarbonyl compound, the tricyclic compounds of the Formula I or the tetracyclic compounds of the Formula II are obtained. The tricyclic compounds are probably intermediate products for the tetracyclic compounds. If, now, the nature and amount of the solvent are so chosen that the tricyclic compounds are sparingly soluble therein, these precipitate from the reaction mixture before a further reaction to give the tetracyclic compound occurs. Even if all the radicals $R_1$, $R_2$ and $R_3$ of the dioxo compound are different from hydrogen, the reaction stops at the tricyclic compounds, presumably for steric reasons.

By virtue of their insolubility in the reaction medium, the metal complexes obtained can easily be isolated by filtration. They are valuable dyestuffs which can be used for dyeing the most diverse materials. The compounds which are free of acid groups which confer solubility in water are in particular suitable for pigmenting high molecular organic material, for example cellulose ethers and cellulose esters, such as ethylcellulose, acetylcellulose or nitrocellulose, polyamides, polyurethanes or polyesters, natural resins or synthetic resins, for example aminoplasts, especially ureaformaldehyde and melamine-formaldehyde resins, alkyd resins, phenoplasts, polycarbonates, polyolefines, such as polystyrene, polyvinyl chloride, polyethylene, polypropylene, polyacrylonitrile, polyacrylic acid esters, rubber, casein, silicone and silicone resins, individually or as mixtures. Here it does not matter whether the high molecular compounds mentioned are in the form of plastic masses or melts or in the form of spinning solutions, lacquers, paints or printing inks. Depending on the end use, it proves advantageous to use the new pigments as toners or in the form of preparations. The new pigments are as a rule distinguished by high general fastness properties, colour strength and fastness to migration.

Those of the compounds obtained according to the invention which contain sulphonic acid groups can be converted by reaction with water-soluble calcium salts or barium salts into the insoluble calcium lakes or barium lakes, which are also outstandingly suitable for use as pigments.

Those metal complexes of the Formulae I and II wherein $R_2$ denotes a halogen atom or a nitro, nitrile or arylazo group are new compounds.

The success of the process according to the invention is surprising since it is known from the literature that o-diamines react with 1,3-dicarbonyl compounds to give 1,5-diazepines. (See, for example, F.D. Popp and A. Catala Noble: "The Chemistry of Diazepines" in Advances on Heterocyclic Chemistry 8 21–82, especially page 67–68, (1967), and Jager, Z. anorg. und allg. Chemie 364 180 (1969)). Admittedly, tricyclic and tetracyclic metal complexes of the Formulae I and II in which $R_2$ is hydrogen are already known. They result, for example, from the reaction of o-diamines with ethinyl compounds, such as propargylaldehyde, in the presence of metal-donating agents (see DOS 1,569,667 which was published on Jan. 14, 1971 and Dimroth, Annalen 717, 137 (1968)). However, it is not possible by means of this process to arrive at compounds of the Formula I wherein $R_2$ is different from hydrogen; furthermore, the ethinyl compounds which serve as the starting substances are more difficult to obtain than the 1,3-dicarbonyl compounds to be used according to the invention. It is furthermore known that compounds of the Formula I are obtained if 2 mols of a 2-alkoxymethylene-1,3-dicarbonyl compound are allowed to react with 1 mol of an o-phenylenediamine and the reaction product is subsequently metallised. In a second stage, the metal complexes of the Formula I can be cyclised in a melt of o-phenylenediamine to give the tetracyclic compounds of the Formula II [see Jager, Z. anorg. allg. Chemie 337, 80 (1965), 346, 76 (1966) and 364, 177 (1969)]. The process according to the invention is distinguished, relative to this process, through the fact that it takes place with substantially better yield, can be carried out in a single step, uses starting products which are simply accessible and permits greater variation of the substituent $R_2$.

According to Jager, Z. anorg. and allg. Chemie 337 page 84, compounds of the Formula I can furthermore be manufactured by reacting 2 mols of the sodium salt of an appropriate hydroxymethyleneketone with 1 mol of a 1,2-diamine, for example of o-phenylenediamine, and subsequently metallising the compound formed. In this case, however, in contrast to the use of free 1,3-dicarbonyl compounds, a diazepine formation is not possible as a competing reaction.

In the examples which follow the parts, unless otherwise stated, denote parts by weight and the percentages denote percentages by weight.

EXAMPLE 1

5.28 g (0.030 mol) of phenylazomalondialdehyde are added at 60°C to a solution of 3.72 g (0.015 mol) of Ni(CH$_3$COO)$_2$. 4 H$_2$O and 3.24 g (0.030 mol) of o- phenylenediamine in 100 ml of glacial acetic acid. The reaction mixture is stirred for 5 minutes at the reflux temperature, whereupon a brown precipitate forms after a few seconds. After cooling to 20°C, the mixture is filtered and the residue is washed with glacial acetic acid, water and acetone. 5.8 g (70% of theory) of the brown dyestuff of the formula

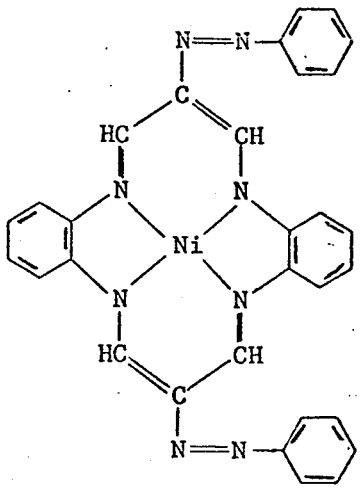

VI which dyes polyvinyl chloride in brown shades, are obtained.

Analysis:
C₃₀H₂₂N₈Ni (Molecular weight 552.7)

| | | C | | H | | N | | Ni | |
|---|---|---|---|---|---|---|---|---|---|
| Calculated | | 65.1 | | 4.0 | | 20.3 | | 10.6 | |
| Found | | 65.3 | | 3.9 | | 20.4 | | 10.3 | |

EXAMPLE 2

4.90 g (0.020 mol) of 2,5-dichlorophenyl-azo-malondialdehyde are added at 60°C to a solution of 2.49 g (0.010 mol) of Ni(CH₃COO)₂.4H₂O and 5.28 g (0.020 mol) of 3,4-diaminobenzoic acid 2-octyl ester in 100 ml of glacial acetic acid. The reaction mixture is stirred for 5 minutes at the reflux temperature whereupon a red-brown precipitate forms after a few seconds. After cooling to 20°C the mixture is filtered off and the residue is washed with glacial acetic acid, water and acetone. 8.80 g (88% of theory) of the analytically pure dyestuff of the formula

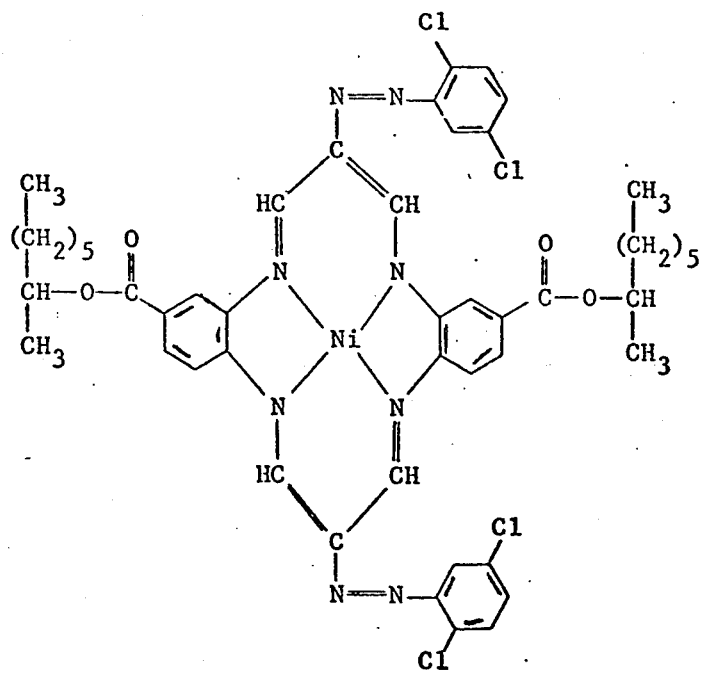

VII which dyes polyvinyl chloride is brown shades, are obtained.

Analysis:
C₄₈H₅₀Cl₄N₈NiO₄ (Molecular weight 1002.7)

| | | C | | H | | Cl | | N | | Ni | |
|---|---|---|---|---|---|---|---|---|---|---|---|
| Calculated | | 57.4 | | 4.98 | | 14.15 | | 11.15 | | 5.85 | |
| Found | | 57.3 | | 5.1 | | 14.3 | | 11.3 | | 5.9 | |

EXAMPLE 3

A solution of 24.9 g (0.1 mol) of Ni(CH$_3$COO)$_2$.4-H$_2$O and of 21.6 g (0.2 mol) of o-phenylenediamine in 250 ml of alcohol is warmed to 60°C over the course of one hour. 20.2 g (0.1 mol) of acetylacetone are then added dropwise at this temperature and the reaction mixture is heated overnight under reflux. After cooling to 20°C, the mixture is filtered and the violet crystals, which have a metallic gloss, are washed with water, a little alcohol and acetone. 17.3 g (43% of theory) of the nickel complex of the formula

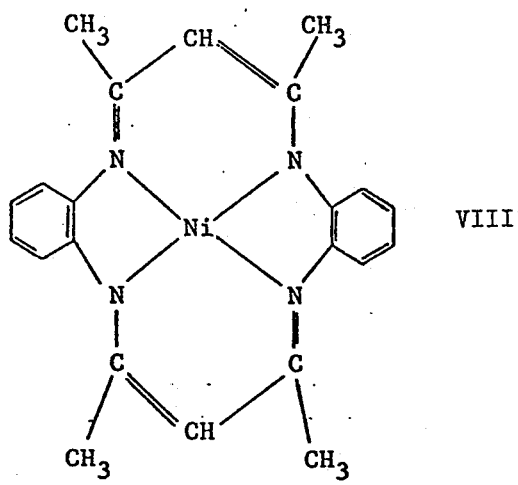

VIII which dyes polyvinyl chloride in green shades, are obtained.

Analysis:
C$_{22}$H$_{22}$N$_4$Ni (Molecular weight 401.1)

| | | | | | | | | |
|---|---|---|---|---|---|---|---|---|
| Calculated | C | 65.9 | H | 5.93 | N | 13.97 | Ni | 14.64 |
| Found | | 64.5 | | 5.4 | | 13.8 | | 14.5 |

The table which follows lists further tetracyclic metal complexes of the initially mentioned Formula I), which were obtained if, following the instructions of the preceding examples, a dioxo compound of the formula

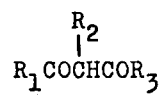

wherein the substituents R$_1$, R$_2$ and R$_3$ have the meanings indicated in columns 2-4, is reacted with the 1,2-diamine mentioned in column 5 and the acetate of the metal listed in column 1. The dyestuffs obtained dye polyvinyl chloride in brown shades, with the exception of Examples 26 and 27, which dye PVC in green shades.

| | 1 | 2 | 3 | 4 | 5 |
|---|---|---|---|---|---|
| | Metal | R$_1$ | R$_2$ | R$_3$ | 1,2-Diamine |
| 4 | Ni | H | H | H | o-Phenylenediamine |
| 5 | Ni | H | CH$_3$ | H | o-Phenylenediamine |
| 6 | Ni | H | H | CH$_3$ | o-Phenylenediamine |
| 7 | Ni | H | CN | H | o-Phenylenediamine |
| 8 | Ni | H | CH$_3$ | H | 4-Phenoxy-1,2-phenylenediamine |
| 9 | Ni | H | Phenylazo | H | o-Phenylenediamine |
| 10 | Ni | H | Phenylazo | H | 4-Chloro-1,2-phenylenediamine |
| 11 | Ni | H | Phenylazo | H | 4,5-Dichloro-1,2-phenylenediamine |
| 12 | Ni | H | Phenylazo | H | 4-Ethylsulphonyl-1,2-phenylenediamine |
| 13 | Ni | H | Phenylazo | H | 2,3-Diamino-quinoxaline |

—Continued

| | | | | | |
|---|---|---|---|---|---|
| 14 | Ni | H | Phenylazo | H | 2,3-Diaminodiphenylene oxide |
| 15 | Ni | H | p-Chlorophenylazo | H | o-Phenylenediamine |
| 16 | Ni | H | p-Chlorophenylazo | H | 4-Carboxy-1,2-phenylenediamine |
| 17 | Ni | H | p-Nitrophenylazo | H | o-Phenylenediamine |
| 18 | Ni | H | o-Sulphophenylazo | H | o-Phenylenediamine |
| 19 | Ni | H | m-Acetylaminophenylazo | H | o-Phenylenediamine |
| 20 | Ni | H | p-Cyanophenylazo | H | o-Phenylenediamine |
| 21 | Ni | H | 2',5'-Disulphophenylazo | H | o-Phenylenediamine |
| 22 | Ni | H | 2',5'-Dichlorophenylazo | H | o-Phenylenediamine |
| 23 | Ni | H | 2',5'-Dichlorophenylazo | H | 3,4-Diaminobenzoic acid 2'-n-octyl ester |
| 24 | Ni | H | 2',4',5'-Trichlorophenylazo | H | o-Phenylenediamine |
| 25 | Ni | H | 2',3',4'-Trichlorophenylazo | H | o-Phenylenediamine |
| 26 | Ni | $CH_3$ | H | $CH_3$ | 4,5-Dimethyl-1,2-phenylenediamine |
| 27 | Ni | $CH_3$ | H | $CH_3$ | 4-Chloro-1,2-phenylenediamine |
| 28 | Ni | H | p-Acetylphenylazo | H | o-Phenylenediamine |
| 29 | Ni | H | p-Acetylphenylazo | H | 2,3-Diaminopyridine |
| 30 | Ni | H | p-Cyanophenylazo | H | 2,3-Diaminopyridine |
| 31 | Ni | H | Phenylazo | H | 2,3-Diaminopyridine |
| 32 | Ni | H | p-Phenylazo-phenylazo | H | o-Phenylenediamine |
| 33 | Ni | H | p-Acetylamino-phenylazo | H | o-Phenylenediamine |
| 34 | Ni | H | Phenylazo | H | 4-Nitro-1,2-phenylenediamine |
| 35 | Cu | H | Phenylazo | H | o-Phenylenediamine |
| 36 | Cu | H | p-Cyanophenylazo | H | o-Phenylenediamine |
| 37 | Cu | H | p-Chlorophenylazo | H | o-Phenylenediamine |
| 38 | Zn | H | Phenylazo | H | o-Phenylenediamine |
| 39 | Ni | H | Phenylazo | H | 3,4-diamino-N-(2,6-dichlorophenyl)benzamide |
| 40 | Cu | H | ditto | H | ditto |
| 41 | Ni | H | p-Acetylphenylazo | H | ditto |
| 42 | Cu | H | ditto | H | ditto |
| 43 | Ni | H | Phenylazo | H | 3,4-diamino-N-(2-chloro-4,6-dimethoxyphenyl)benzamide |

— Continued

| 44 | Cu | H | ditto | H | ditto |
|---|---|---|---|---|---|
| 45 | Ni | H | p-Acetylphenylazo | H | ditto |
| 46 | Cu | H | p-Acetylphenylazo | H | $H_2N$-, $H_2N$-…CONH-…CH$_3$O-…-Cl, OCH$_3$ |
| 47 | Co | H | Phenylazo | H | $H_2N$-, $H_2N$-…Cl, Cl |
| 48 | Co | H | p-Acetylphenylazo | H | $H_2N$-, $H_2N$-…Cl, Cl |

EXAMPLE 49

A solution of 12.44 g (0.05 mol) of Ni(CH$_3$COO)$_2$.4-H$_2$O and of 5.40 g (0.05 mol) of o-phenylenediamine in 400 ml of methylcellosolve in warmed to 80°C under nitrogen over the course of 1 hour. 22.0 g (0.10 mol) of p-nitro-phenylazomalondialdehyde dissolved in 400 ml of methylcellosolve are then added dropwise and the reaction mixture is stirred for a further 2 hours at 80°C (under nitrogen). After cooling to 20°C, the dyestuff which has precipitated is filtered off and washed with methylcellosolve, water, alcohol and acetone. 15.7 g (55% of theory) of the dark brown nickel complex of the formula

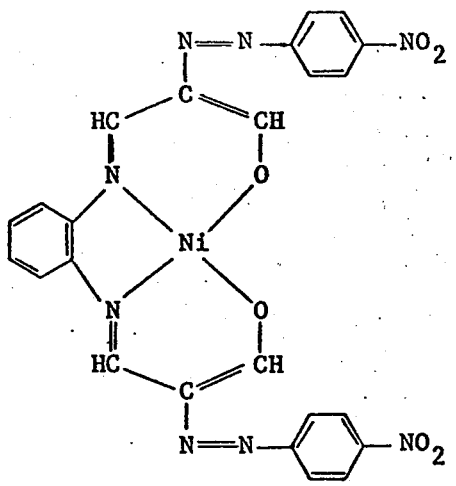

IX are obtained.

Analysis:
$C_{21}H_{16}N_8NiO_6$

| | | | | | | | | |
|---|---|---|---|---|---|---|---|---|
| Calculated | C | 50.5 | H | 2.81 | N | 19.6 | Ni | 10.3 |
| Found | | 50.5 | | 2.8 | | 19.3 | | 10.2 |

EXAMPLE 50

65 parts of stabilised polyvinyl chloride, 35 parts of dioctyl phthalate and 0.2 part of the dyestuff obtained according to Example 1 are stirred together and then milled on a two-roll calender for 7 minutes at 140°C. A film which is dyed brown, of good fastness to light and migration, is obtained.

We claim:
1. A polycyclic metal complex of the formula

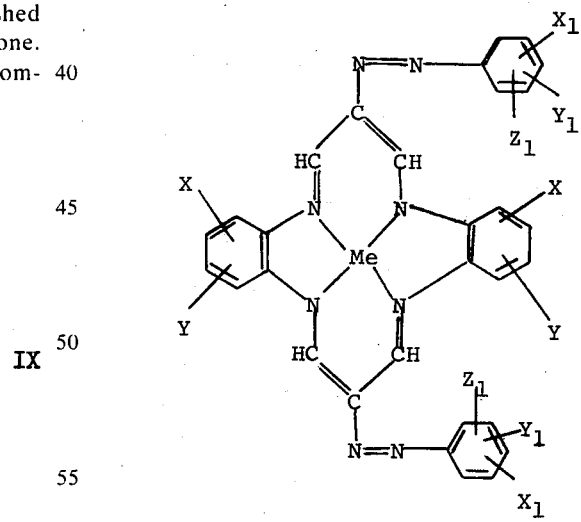

wherein X and Y is hydrogen, chloro, lower alkyl, lower alkoxy, phenoxy, phenyl, carboxy, lower alkoxycarbonyl, lower alkanoyl amino, aminocarbonyl, lower alkylsulphonyl or sulphonic acid group; Me is Cu,Zn,Ni or Co; $X_1$ and $Y_1$ are hydrogen, chloro, lower alkyl, lower alkoxy, phenoxy, phenylazo, lower acyl, trifluoromethyl, lower alkylsulphonyl, nitro, cyano, alkoxycarbonyl, acetylamino, aminocarbonyl, carboxylic acid group or sulphonic acid group; and $Z_1$ is hydrogen, chloro, or acetyl.

2. The polycyclic metal complex of claim 1 of the formula
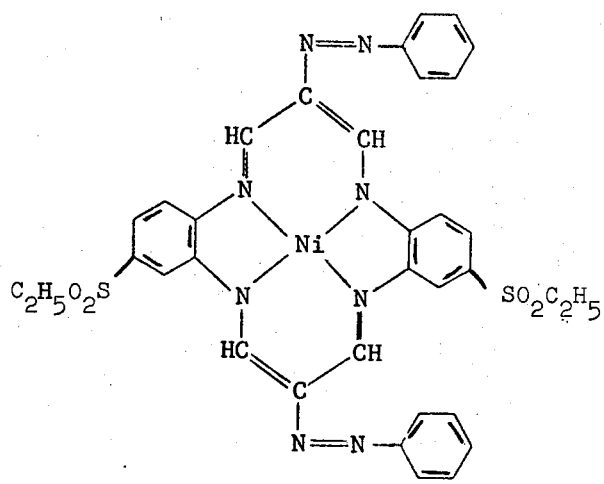
3. The polycyclic metal complex of claim 1 of the formula
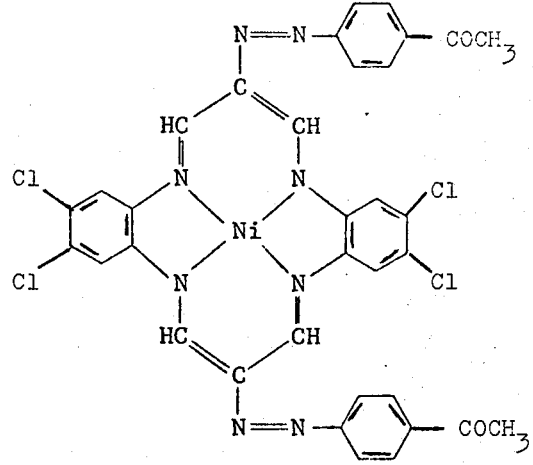
4. The polycyclic metal complex of claim 1 of the formula
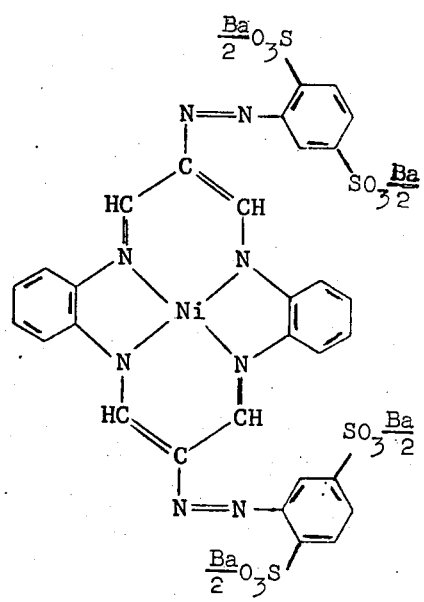
* * * * *